United States Patent
Gerum

(10) Patent No.: US 9,708,967 B2
(45) Date of Patent: Jul. 18, 2017

(54) FRESH GAS SUPPLY DEVICE FOR AN INTERNAL COMBUSTION ENGINE AND METHOD OF OPERATING SAME

(75) Inventor: Eduard Gerum, Rosenheim (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 815 days.

(21) Appl. No.: 13/548,678

(22) Filed: Jul. 13, 2012

(65) Prior Publication Data

US 2012/0297769 A1   Nov. 29, 2012

Related U.S. Application Data

(63) Continuation of application No. PCT/EP2011/050280, filed on Jan. 11, 2011.

(30) Foreign Application Priority Data

Jan. 14, 2010   (DE) .................. 10 2010 004 657

(51) Int. Cl.
  *F02B 33/44*   (2006.01)
  *F02B 21/00*   (2006.01)
  (Continued)

(52) U.S. Cl.
  CPC .............. *F02B 21/00* (2013.01); *F02B 37/10* (2013.01); *F02D 9/02* (2013.01); *F02D 9/1025* (2013.01);
  (Continued)

(58) Field of Classification Search
  CPC ....... Y02T 10/121; Y02T 10/144; F02D 9/10; F02D 9/1035; F02D 2700/0246;
  (Continued)

(56) References Cited

U.S. PATENT DOCUMENTS 3,020,901 A * 2/1962 Cook ...................... 123/559.1
3,807,367 A * 4/1974 Lamm ....................... 123/207
(Continued)

FOREIGN PATENT DOCUMENTS

CA   2 500 146 A1   9/2006
DE   32 05 721 A1   8/1983
(Continued)

OTHER PUBLICATIONS

International Preliminary Report on Patentability (PCT/IB/338 & PCT/IB/373), including Written Opinion (PCT/ISA/237) dated Aug. 16, 2012 (six (6) pages).
(Continued)

*Primary Examiner* — Phutthiwat Wongwian
*Assistant Examiner* — Thomas Olszewski
(74) *Attorney, Agent, or Firm* — Crowell & Moring LLP

(57) ABSTRACT

A fresh gas supply device for an internal combustion engine having an exhaust gas turbocharger includes a charge air inlet for taking in a compressed charge air flow from the exhaust gas turbocharger; an outlet which is connected to the charge air inlet via a valve section, said valve section being closed in a closed position by at least one flap valve which can be pivoted, preferably, about a flap rotational axis; an adjusting device which is coupled to the at least one flap valve for adjusting the same in the closing direction; and a compressed air inlet for taking in compressed air into the outlet. The compressed air inlet is arranged such that the compressed air is directed into a compressed air flow in the direction of the valve section to the at least one flap valve. A corresponding method for operating the fresh gas supply device is provided.

12 Claims, 3 Drawing Sheets

(51) Int. Cl.
*F02B 37/10* (2006.01)
*F02D 9/02* (2006.01)
*F02D 9/10* (2006.01)
*F02D 41/00* (2006.01)
*F02M 23/08* (2006.01)
*F02B 29/04* (2006.01)

(52) U.S. Cl.
CPC ....... *F02D 9/1045* (2013.01); *F02D 41/0007* (2013.01); *F02M 23/08* (2013.01); *F02B 29/0406* (2013.01); *Y02T 10/144* (2013.01); *Y02T 10/146* (2013.01)

(58) Field of Classification Search
CPC ........ F02B 31/06; F02B 37/16; F02B 37/183; F02M 25/0724; F02M 25/0793
USPC ............. 60/611, 605.1, 605.2; 123/308, 442; 137/605; 251/305
See application file for complete search history.

(56) References Cited

U.S. PATENT DOCUMENTS

| | | | |
|---|---|---|---|
| 4,817,374 A | | 4/1989 | Kitta |
| 4,921,406 A * | | 5/1990 | Burger ............................ 417/87 |
| 5,148,776 A * | | 9/1992 | Connor ......................... 123/25 J |
| 6,295,815 B1 * | | 10/2001 | Bechle et al. ............... 60/605.2 |
| 6,604,516 B1 * | | 8/2003 | Krimmer et al. ........ 123/568.18 |
| 7,866,156 B2 * | | 1/2011 | Nemeth et al. ............. 60/605.1 |
| 8,316,642 B2 * | | 11/2012 | McEwan et al. ............... 60/612 |
| 8,517,001 B2 * | | 8/2013 | Kado et al. .................. 123/572 |
| 2008/0072595 A1 | | 3/2008 | Nemeth et al. |
| 2008/0173279 A1 * | | 7/2008 | Pringle et al. ................ 123/337 |
| 2009/0050094 A1 * | | 2/2009 | Sano ........................ 123/184.21 |
| 2011/0252784 A1 | | 10/2011 | Rebhan et al. |

FOREIGN PATENT DOCUMENTS

| | | |
|---|---|---|
| DE | 39 36 566 A1 | 5/1991 |
| DE | 37 80 733 T2 | 1/1993 |
| DE | 196 47 958 A1 | 5/1998 |
| DE | 199 13 157 A1 | 10/2000 |
| DE | 10 2006 039 300 A1 | 2/2008 |
| DE | 20 2008 017 549 U1 | 1/2010 |
| KR | 20-0242558 Y1 | 9/2001 |
| KR | 10-2007-0110090 A | 11/2007 |
| KR | 10-0774738 B1 | 11/2007 |
| WO | WO 95/16156 A1 | 6/1995 |
| WO | WO 2006/089779 A1 | 8/2006 |
| WO | WO 2007/058524 A1 | 5/2007 |
| WO | WO 2010/031560 A1 | 3/2010 |

OTHER PUBLICATIONS

German Examination Report dated Oct. 1, 2010 including English-language translation (Ten (10) pages).
International Search Report dated May 27, 2011 including English-language translation (Six (6) pages).
Chinese Office Action dated Jan. 8, 2014 (7 pages).
Korean-language Office Action issued in counterpart Korean Application No. 10-2012-7019734 dated Apr. 17, 2017 with English translation (11 pages).

* cited by examiner

FRESH GAS SUPPLY DEVICE FOR AN INTERNAL COMBUSTION ENGINE AND METHOD OF OPERATING SAME

CROSS-REFERENCE TO RELATED APPLICATIONS

This application is a continuation of PCT International Application No. PCT/EP2011/050280, filed Jan. 11, 2011, which claims priority under 35 U.S.C. §119 from German Patent Application No. DE 10 2010 004 657.4, filed Jan. 14, 2010, the entire disclosures of which are herein expressly incorporated by reference.

BACKGROUND AND SUMMARY OF THE INVENTION

The invention relates to a fresh gas supply device for an internal combustion engine. The invention also relates to a method for operating the fresh gas supply device.

Internal combustion engines, for example diesel engines, are often equipped with exhaust gas turbochargers. FIG. 1 illustrates an internal combustion engine 1, the exhaust gas line 14 of which is connected to an exhaust gas turbine 4 of an exhaust gas turbocharger 2. This exhaust gas turbine 4 drives a compressor 3 of the exhaust gas turbocharger 2. The compressor 3 compresses intake air from a fresh gas inlet 8 and consequently increases an intake pressure in an intake line 13 of the internal combustion engine 1. As a result, for example, an acceleration behavior of the vehicle having the internal combustion engine 1 is improved and a reduction in fuel consumption is achieved.

However, the exhaust gas turbocharger 2 is not capable of conveying sufficient air, and therefore of generating sufficient intake pressure, in every operating state of the internal combustion engine 1. For example, piston engines, such as diesel engines, with an exhaust gas turbocharger 2 have, for example, an operating state during acceleration which is designated as "turbo lag". In this case, when the accelerator pedal is depressed, the internal combustion engine 1 reacts with an increase in rotational speed only after a specific delay time in which no exhaust gas energy, that is to say also no sufficient exhaust gas pressure, for driving the exhaust gas turbocharger 2 and therefore no compressed intake air with a corresponding intake pressure are available. To bridge this "turbo lag", proposals for a solution have been made in which compressed air is introduced, for example from a compressed air reservoir 6 fed by an air compressor 7, into the intake line 13 of the internal combustion engine 1 in a controlled manner, in order, when the internal combustion engine 1 has an increased intake air demand, to cover this. This takes place by way of a fresh gas supply device 20, which is arranged between the compressor 3 of the turbocharger 2 (or a charge air cooler 5 following in a flow direction) and the intake line 13.

Such a fresh gas supply device 20 is illustrated diagrammatically in FIGS. 2 and 3 in sectional views in two operating states or positions. The fresh gas supply device 20 has a housing body 21 and is connected by way of a charge air inlet 9 to the charge air cooler 5, by way of an outlet 10 to the intake line 13, and by way of a compressed air inlet 11, via a compressed air line 12, to the compressed air reservoir 6. Located between the charge air inlet 9 and the outlet 10, between an inlet portion 16 and an outlet portion 18, is a valve portion 17 in which a flap valve 23 for closing and opening the valve portion 17 is arranged. The flap valve 23 is preferably designed to be pivotable about a flap axis of rotation 24. The compressed air line 12 with the compressed air inlet 11 communicates via an injection port 19 with the outlet portion 18. In this case, the compressed air line 12 is arranged such that a compressed air flow 30 is directed toward the outlet 10 of the outlet portion 18.

FIG. 2 shows the fresh air supply device 20 in a position for additional air or compressed air. In this case, the flap valve 23 is pivoted about the flap axis of rotation 24 such that it closes the valve portion 17 and therefore the connection of the inlet portion 16 to the outlet portion 18. In this closing position, the flap valve 23 bears with its outer margin against a stop portion 25 of the housing body 21 and closes the valve portion 17.

FIG. 3 illustrates the fresh air supply device 20 in a position for charge air. The flap valve 23 is pivoted counterclockwise about the flap axis of rotation 24 and has opened the valve portion 17. The charge air flow 28 can flow through the valve portion 17 into the outlet portion 18 and into the outlet 10 in order to form an intake flow 29, which flows into the intake line 13 of the internal combustion engine 1. The compressed air flow 30 is absent in this case, the compressed air line 12 being closed, for example, by means of a valve.

In one version, the flap valve 23 pivots into its closing position (FIG. 2) when the pressure in the flow direction of an intake flow 29 into the intake line 13 (not shown here) in the outlet portion 18 is higher than the pressure of a charge air flow 28 in the inlet portion 16. This takes place in that, when torque is required for the internal combustion engine 1, the compressed air line 12 is acted upon in a way not shown by the compressed air flow 30 for the additional air to be injected. For this purpose, however, the corresponding pressure first has to build up, and therefore losses may occur. This compressed air injection can take place, in practice, only when no compressed air losses occur on account of the compressed air available to a limited extent in a vehicle. For this reason, the flap valve 23 prevents a backflow of the compressed air flow 30 into an opposite charge air flow 28 into the inlet portion 16. The flap valve 23 is coupled to an adjusting device 22, which is normally formed by a restoring spring which, in the absence of the pressure of the charge air flow 28, pivots the flap valve 23 into the closed position shown in FIG. 2, that is to say the position for compressed air. In the case of such an adjusting device 22 with a spring, that is to say in the case of what is known as a spring non-return valve, the closing times may become too long. Too much compressed air may therefore flow into the inlet portion 16 and in the direction of the charge air cooler 5 or compressor 3.

In another version of a device for the fresh air supply of a turbocharged piston internal combustion engine and a method for the operation thereof which is described in the application WO 2006/089779 A1, the flap valve 23 is adjusted by the adjusting device 22, for example designed as a variable displacement motor. Furthermore, the compressed air inlet 11 is connected to the compressed air reservoir 6 by means of the outlet 10 via a quantity regulating device (not shown), for example a valve. A control device, not shown, serves for controlling the quantity regulating device and the variable displacement motor. In the event of a torque requirement during "kick down", the quantity regulating device feeds a compressed air flow 30 through the compressed air inlet 11 to the outlet 10. The flap valve 23 is previously closed by the adjusting device 22, so that the compressed air flow 30 does not flow via the charge air inlet 9 into the compressor 3 of the exhaust gas turbocharger 2 opposite to the intake direction or charge air flow 28, but instead, via the outlet 10, into the intake line 13. When the feed of compressed air is ended, this flap valve 23 is opened again and the quantity regulating device is closed. At this time point, the pressure of the charge air flow 28 in the inlet portion 16 through the compressor 3 of the exhaust gas turbocharger 2 is again sufficient.

A flap valve 23 with a restoring spring as an adjusting device 22 may entail a pressure loss and therefore also a loss of time, with accompanying energy consumption. On the other hand, an electrical adjusting device 22, for example a servomotor with a position transmitter and associated activation, results in a larger number of components and a corresponding cost outlay.

The object of the present invention, therefore, is to provide an improved fresh gas supply device. A further object is to specify a corresponding method for operating a fresh gas supply device.

According to one aspect of the invention, a fresh gas supply device is provided for an internal combustion engine having an exhaust gas turbocharger. The fresh gas supply device includes: a charge air inlet for the inlet of a compressed charge air flow out of the exhaust gas turbocharger; an outlet which is connected to the charge air inlet via a valve portion, the valve portion being closeable in a closing position by at least one valve, preferably a flap valve pivotable about a flap axis of rotation; an adjusting device which is coupled to the at least one valve, in particular to the flap valve, for adjusting the latter into the closing position; and a compressed air inlet for the inlet of compressed air into the outlet, the compressed air inlet being arranged such that the compressed air is oriented in a compressed air flow onto the at least one valve, in particular the flap valve, in the direction toward the valve portion.

According to another aspect of the invention, a method is provided for operating a fresh gas supply device for an internal combustion engine having an exhaust gas turbocharger, the fresh gas supply device including: a charge air inlet for the inlet of a compressed charge air flow out of the exhaust gas turbocharger; an outlet which is connected to the charge air inlet via a valve portion, the valve portion being closeable in a closing position by at least one flap valve preferably pivotable about a flap axis of rotation; an adjusting device which is coupled to the at least one flap valve; and a compressed air inlet for the inlet of compressed air into the outlet. The method includes the acts of: determining a torque requirement of the internal combustion engine and monitoring the charge air flow; injecting compressed air into the fresh gas supply device in a compressed air flow oriented onto the at least one flap valve opposite to the direction of the charge air flow, wherein the adjusting device adjusts the at least one flap valve for closing the valve portion, and the compressed air flow assists a closing movement of the at least one flap valve; and ending the injection of compressed air on the basis of the monitoring of the charge air flow.

An advantageous aspect of the invention is to direct the compressed air to be injected toward the valve, in particular the at least one flap valve, opposite to the charge air flow or to an intake flow.

In this case, it is preferably possible that the at least one flap valve is designed as a spring non-return flap valve, the adjusting device being designed as a restoring spring. This simple version can advantageously be implemented with a small number of components.

The at least one flap valve is coupled eccentrically to the flap axis of rotation, and because of this the flows and pressure conditions acting upon the flap valve result in a pivoting movement assisted by the flows and pressure conditions.

For this purpose, it is advantageous that the at least one flap valve has a first onflow portion for cooperation with the charge air flow and a second onflow portion for cooperation with the compressed air flow.

In this case, it is preferable that the compressed air flow is oriented onto the second onflow portion of the at least one flap valve for adjusting the latter into the closing position. This affords the advantage of a marked reduction in the closing time of the simple mechanical spring non-return valve, since the system pressure in compressed air installations in a vehicle amounts, for example, to 8 bar, whereas the charge air pressure when an internal combustion engine is under low load and requires torque is markedly lower than 1 bar. On account of this short closing time, compressed air losses are reduced. A reaction time of the internal combustion engine to the torque requirement, that is to say acceleration of a vehicle which has this internal combustion engine, is thereby increased.

The compressed air inlet can be formed with an injection port which is shaped for steering the compressed air flow onto the second onflow portion of the at least one flap valve favorably in terms of flow. Thus, an installation space is reduced, since a compressed air line connection can consequently be adapted, in its position in the engine space of the vehicle, to the existing installation.

Other objects, advantages and novel features of the present invention will become apparent from the following detailed description of one or more preferred embodiments when considered in conjunction with the accompanying drawings.

DETAILED DESCRIPTION OF THE DRAWINGS

Identical structural elements or functional units having the same function are identified in the figures by identical reference symbols.

Figure 1:
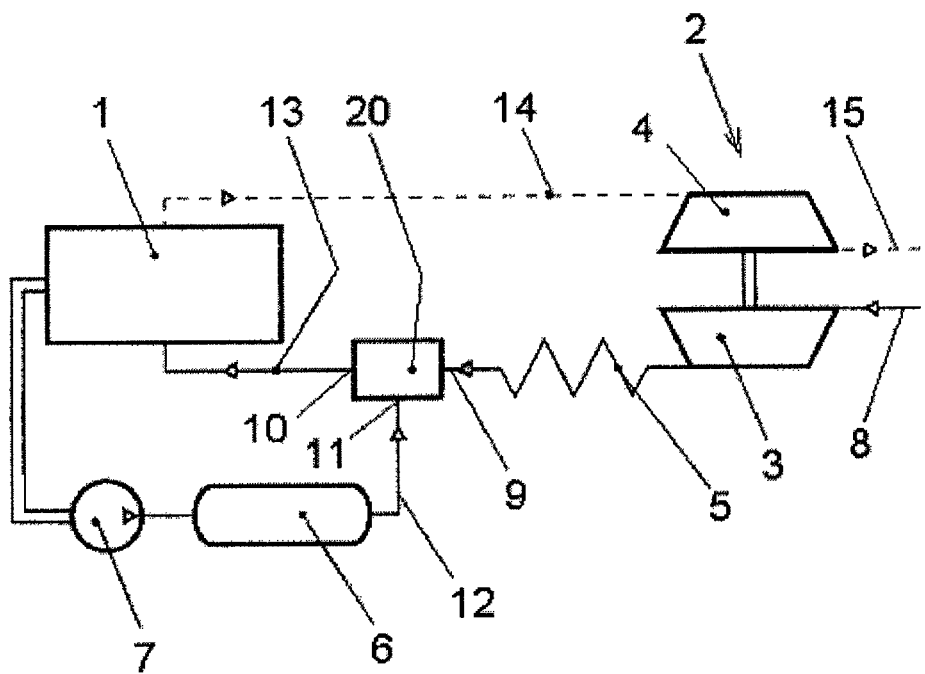
FIG. 1 is a diagrammatic sectional illustration of an internal combustion engine with an exhaust gas turbocharger and with a fresh gas supply device according to the prior art.
Figure 2:
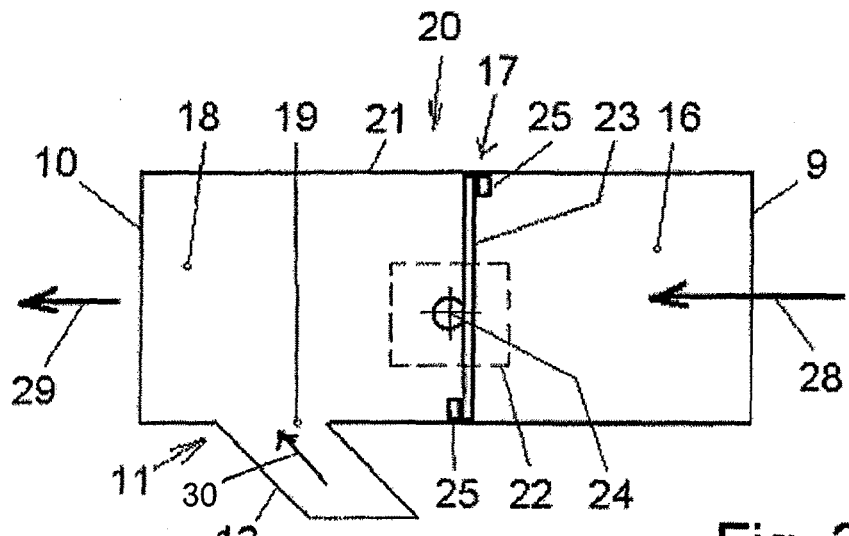
FIG. 2 is a diagrammatic sectional illustration of a conventional fresh gas supply device according to the prior art in a position for compressed air.
Figure 3:
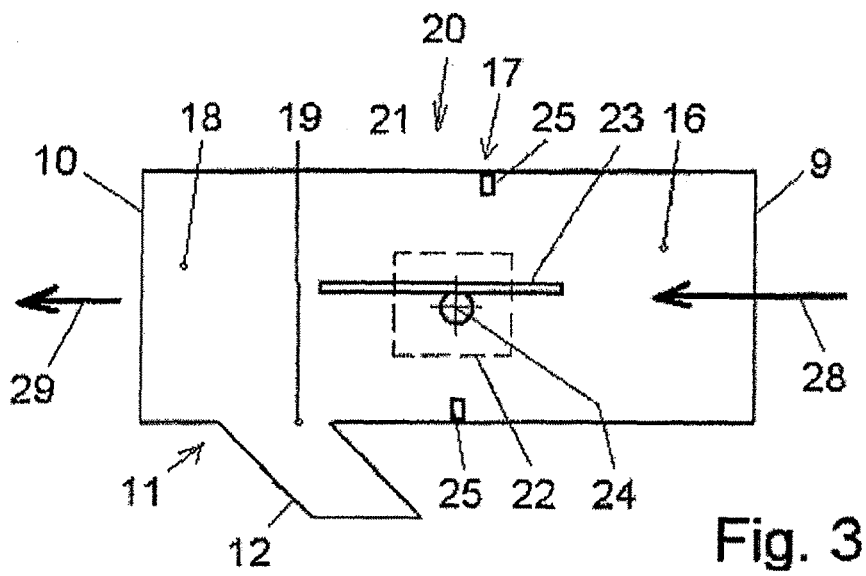
FIG. 3 is a diagrammatic sectional illustration of the conventional fresh gas supply device according to FIG. 2 in a position for charge air.

FIGS. 1 to 3 have already been described above and are not explained any further unless necessary.

Figure 4:
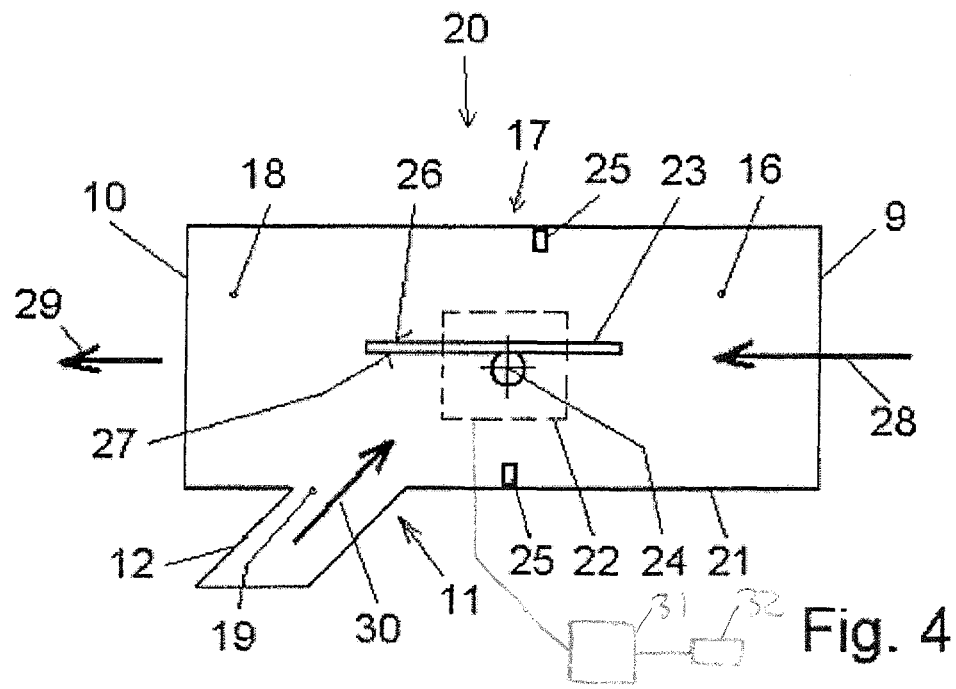
FIG. 4 is a diagrammatic sectional illustration of an exemplary embodiment of a fresh gas supply device according to the invention in a position for charge air.

FIG. 4 illustrates a diagrammatic sectional illustration of an exemplary embodiment of a fresh gas supply device 20 according to the invention in a position for charge air.

The fresh gas supply device 20 has an essentially cylindrical housing body 21 with a charge air inlet 9 (see also FIG. 1) arranged on the right in FIG. 4 and with an outlet 10 arranged on the left. The charge air inlet 9 has adjoining it an inlet portion 16 which merges via a valve portion 17 having a flap valve 23 into an outlet portion 18.

The compressor 3 of the exhaust gas turbocharger 2 is connected to the charge air inlet 9 via the charge air cooler 5 (see FIG. 1). The compressor 3 delivers a charge air stream 28 which flows through the fresh gas supply device 20 in the longitudinal direction of the latter through the charge air inlet 9 in the direction of the outlet 10 and leaves the outlet 10 in the same direction as an intake flow 29.

A compressed air inlet 11 with an injection port 19, as the exit of a compressed air line 12 into the outlet portion 18, is arranged near to the outlet 10. The compressed air line 12 and the compressed air inlet 11 are arranged with respect to the fresh gas supply device 20 such that a compressed air flow 30 (see FIG. 4) is directed, opposite to the charge air flow 28, toward the valve portion 17. In other words, the compressed air line 12 is attached to the fresh gas supply device 20 such that the compressed air line 12 is directed, opposite to the direction of the intake flow 29 of the intake line 13 (see FIG. 1), toward the valve portion 17 at an angle to the longitudinal direction of the fresh gas supply device 20.

Figure 5:
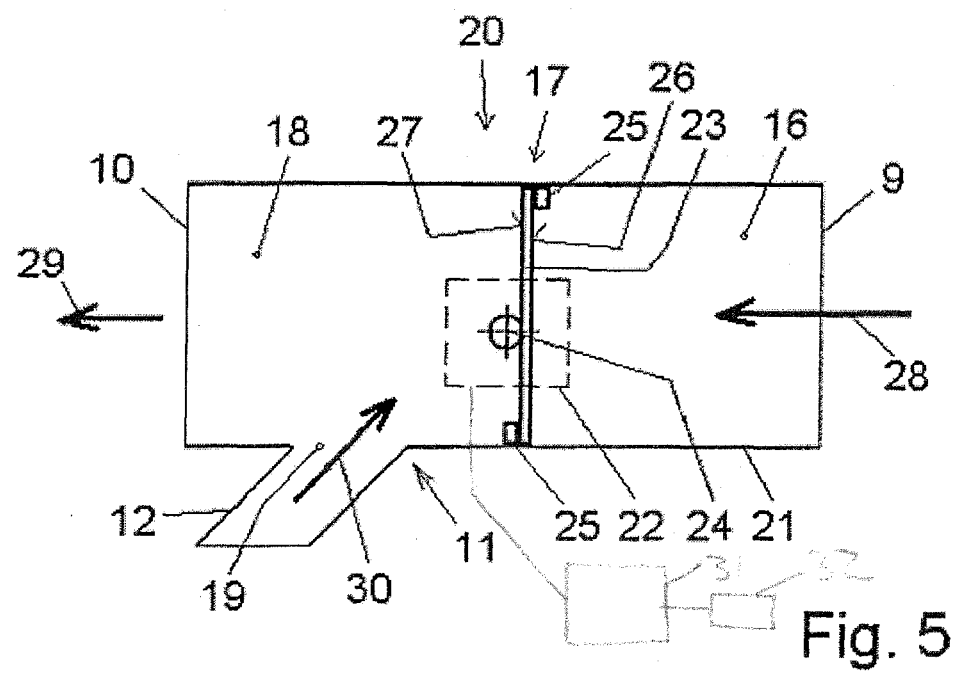
FIG. 5 is a diagrammatic sectional illustration of the fresh gas supply device according to the invention, as shown in FIG. 4, in the position for additional air.

The flap valve 23 is arranged so as to be pivotable about a flap axis of rotation 24 and, in this example, is coupled to an adjusting device 22. The adjusting device 22 is formed with a restoring spring (not illustrated). The restoring spring forces the flap valve 23 clockwise into the closing position, shown in FIG. 5, or the position, for the compressed air against a stop portion 25 of the housing body 21. The flap valve 23 then, with its peripheral margin designed for this purpose, seals off the valve portion 17, with the result that the valve portion 17 is closed. This position is shown in FIG. 5.

When the internal combustion engine 1 is in operation, the intake flow 29 generates in the outlet portion 18 a vacuum which, together with the charge air flow 28, pivots the flap valve 23 counterclockwise, the valve portion 17 being opened in the fully opened position of the flap valve 23 (flap valve 23 parallel to the longitudinal direction of the fresh gas supply device 20), said position being shown in FIG. 4. For this purpose, the flap valve 23 is fastened eccentrically to the flap axis of rotation 24 and has on its longer portion, that is to say from the flap axis of rotation 24 beyond the center of the flap valve 23 as far as its margin, a first onflow portion 26 and a second onflow portion 27 opposite to the first onflow portion 26. The first onflow portion 26 cooperates with the charge air flow 28 in such a way that the charge air flow 28 generates by way of the first onflow portion 26 a moment which pivots the flap valve 23 counterclockwise counter to the force of the restoring spring of the adjusting device 22. Of course, the flap valve 23 can enlarge or reduce the valve portion 17, depending on the current pressure and flow conditions.

In the case of a torque requirement with a high air demand, the turbocharger 2 cannot immediately deliver this air. In this case, in addition, compressed air is injected, for example via a valve, not shown, in the compressed air line 12, in a compressed air flow 30 through the compressed air line 12 and the injection port 19 into the outlet portion 18 in the direction toward the valve portion 17 such that the flap valve 23 closes the valve portion 17 with the assistance of the compressed air flow 30 in addition to the restoring force of the spring of the adjusting device. The compressed air flow 30 is directed against the second onflow portion 27 and gives rise via its flow force (dynamic pressure) to a moment at the flap valve 23 clockwise about the flap axis of rotation 24 for the purpose of closing the flap valve 23. Since the system pressure in compressed air installations in vehicles usually amounts to at least 8 bar and, when the internal combustion engine 1 is under low load, and only in this operating range is external charging by the compressed air flow 30 employed, the charge pressure of the charge air flow 28 is markedly less than 1 bar, the closing time of the flap valve 23 is considerably shortened. Owing to this high dynamic pressure of the compressed air flow 30 in the outlet portion 18, the flap valve 23 remains closed in a stable manner while this additional air is being injected.

Since the flap valve 23 is closed, the charge air pressure of the turbocharger 2, which, owing to the compressed air supplied, acquires a corresponding exhaust gas stream and accelerates more quickly, is also increased more quickly. When the charge air pressure has reached a specific value, the quantity regulating device or the valve (not shown) in the compressed air line 12 is closed (in a manner not described in any greater detail here) and the dynamic pressure of the compressed air flow 30 in the outlet region 18 decreases, while the flap valve 23, assisted by the charge air flow 28 acting on the first onflow portion 26, can open again (FIG. 4).

A method for operating the fresh gas supply device 20 has a first method step in which a torque requirement of the internal combustion engine is determined. In this case, further operating parameters of the internal combustion engine 1, such as, for example, the pressure of the charge air flow 28 and/or the rotational speed of the internal combustion engine, may be monitored and may also be involved in the decision. If a torque requirement is correspondingly present, the charge air flow 28 generating only low or no pressure, in a second method step compressed air is injected into the fresh gas supply device 20 opposite to the direction of the charge air flow 28. In this case, the flap valve 23 is closed. When the charge pressure rises or the charge air flow 28 increases on account of a higher rotational speed of the internal combustion engine 1 and therefore also of the turbocharger 2, the injection of compressed air is discontinued.

It is contemplated, for example, that more than one restoring spring is provided as an adjusting device 22.

For example, the compressed air line 12 may branch into two or more ducts and issue at least partially on the circumference of the fresh gas supply device 20 with two or more injection ports into the outlet portion 18.

More flap valves 23 than one may also be provided.

The housing body 21 may also have other shapes, for example an elliptic cross section. The housing body 21 may also have an angled or arcuate form in its longitudinal direction.

It is contemplated that the flap valve 23 is a non-return valve in which at least one side edge runs in a straight line and is provided with the flap axis of rotation 24, the flap valve 23 being pivotable about this side edge.

The injection port 19 may be shaped favorably in terms of flow such that it steers the compressed air stream onto the second onflow portion 27 of the flap valve 23 in a directed manner.

LIST OF REFERENCE SYMBOLS

1 Internal combustion engine
2 Exhaust gas turbocharger
3 Compressor
4 Exhaust gas turbine
5 Charge air cooler
6 Compressed air reservoir 7 Air compressor
8 Fresh gas inlet
9 Charge air inlet
10 Outlet
11 Compressed air inlet
12 Compressed air line
13 Intake line
14 Exhaust gas line
15 Exhaust gas outlet
16 Inlet portion
17 Valve portion
18 Outlet portion
19 Injection port
20 Fresh gas supply device
21 Housing body
22 Adjusting device
23 Flap valve
24 Flap axis of rotation
25 Stop portion
26 First onflow portion
27 Second onflow portion
28 Charge air flow
29 Intake flow
30 Compressed air flow The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fresh gas supply device for an internal combustion engine having an exhaust gas turbocharger, the fresh gas supply device comprising:
    a charge air inlet for inlet of compressed charge air flow from the exhaust gas turbocharger;
    an outlet connected to the charge air inlet;
    a valve portion arranged between the charge air inlet and the outlet, the valve portion being closeable by at least one valve in a closing position that blocks the compressed charge air flow from the exhaust gas turbocharger to the outlet;
    an adjusting device coupled to the at least one valve for adjusting the at least one valve into the closing position; and
    a compressed air inlet for inlet of compressed air into the outlet, the compressed air inlet being operatively arranged to direct the compressed air from the compressed air inlet in a direction toward the at least one valve such that the compressed air from the compressed air inlet impinges against an outlet side of the at least one valve in a manner that assists movement of the at least one valve to the closing position.

2. The fresh gas supply device according to claim 1, wherein the at least one valve is a flap valve pivotable about a flap access of rotation.

3. The fresh gas supply device according to claim 2, wherein the flap valve is coupled eccentrically to the flap axis of rotation.

4. The fresh gas supply device according to claim 2, wherein the flap valve has a first onflow portion cooperating with the charge air flow and a second onflow portion cooperating with the compressed air flow.

5. The fresh gas supply device according to claim 2, wherein the flap valve is a spring non-return flap valve, and wherein the adjusting device is a restoring spring.

6. The fresh gas supply device according to claim 5, wherein the flap valve is coupled eccentrically to the flap axis of rotation.

7. The fresh gas supply device according to claim 3, wherein the flap valve has a first onflow portion cooperating with the charge air flow and a second onflow portion cooperating with the compressed air flow.

8. The fresh gas supply device according to claim 6, wherein the flap valve has a first onflow portion cooperating with the charge air flow and a second onflow portion cooperating with the compressed air flow.

9. The fresh gas supply device according to claim 4, wherein the compressed air flow is oriented onto the second onflow portion of the flap valve for adjusting the flap valve into the closing position.

10. The fresh gas supply device according to claim 8, wherein the compressed air flow is oriented onto the second onflow portion of the flap valve for adjusting the flap valve into the closing position.

11. The fresh gas supply device according to claim 9, wherein the compressed air inlet includes an injection port operatively configured for guiding the compressed air flow onto the second onflow portion of the flap valve.

12. The fresh gas supply device according to claim 10, wherein the compressed air inlet includes an injection port operatively configured for guiding the compressed air flow onto the second onflow portion of the flap valve.

* * * * *